United States Patent
Durante et al.

(10) Patent No.: US 9,516,265 B2
(45) Date of Patent: Dec. 6, 2016

(54) SYSTEM FOR INTEGRATING VIDEO CALLS IN TELEPHONE CALL CENTERS

(71) Applicant: PHONETICA LAB S.R.L., Paderno Dugnano (IT)

(72) Inventors: Marco Durante, Arese (IT); Giuseppe Durante, Arese (IT); Raoul Trevisi, Arconate (IT)

(73) Assignee: PHONETICA LAB S.R.L., Paderno Dugnano (IT)

( * ) Notice: Subject to any disclaimer, the term of this patent is extended or adjusted under 35 U.S.C. 154(b) by 0 days.

(21) Appl. No.: 14/584,856

(22) Filed: Dec. 29, 2014

(65) Prior Publication Data

US 2015/0208030 A1     Jul. 23, 2015

(30) Foreign Application Priority Data

Jan. 22, 2014 (IT) .............................. MI2014A0080

(51) Int. Cl.
| | |
|---|---|
| *H04N 7/14* | (2006.01) |
| *H04M 3/51* | (2006.01) |
| *H04M 3/22* | (2006.01) |
| *H04M 3/523* | (2006.01) |
| *H04M 7/00* | (2006.01) |

(52) U.S. Cl.
CPC ........... *H04N 7/141* (2013.01); *H04M 3/2218* (2013.01); *H04M 3/5183* (2013.01); *H04M 3/5191* (2013.01); *H04M 3/523* (2013.01); *H04M 3/5231* (2013.01); *H04M 7/006* (2013.01); *H04M 2201/50* (2013.01)

(58) Field of Classification Search
CPC .............................. H04N 7/141; H04M 3/5183
USPC ........ 348/14.01, 14.11, 14.08, 645; 370/352; 379/212.01, 265.07, 265.12, 207.11; 709/206, 217; 705/14.1; 704/271
See application file for complete search history.

(56) References Cited

U.S. PATENT DOCUMENTS

| | | | | |
|---|---|---|---|---|
| 5,774,857 | A * | 6/1998 | Newlin ................ | G09B 21/009 704/200 |
| 5,790,180 | A * | 8/1998 | Wild ...................... | H04N 7/002 348/14.04 |
| 5,884,032 | A | 3/1999 | Bateman et al. | |
| 6,021,428 | A * | 2/2000 | Miloslavsky ........ | G06Q 10/107 348/E7.082 |
| 6,175,564 | B1 * | 1/2001 | Miloslavsky ........ | G06Q 10/107 348/E7.082 |

(Continued)

FOREIGN PATENT DOCUMENTS

| | | |
|---|---|---|
| EP | 2088735 A1 | 8/2009 |
| WO | 0026804 A1 | 5/2000 |

OTHER PUBLICATIONS

Italian Search Report, IT MI20140080; 2 pages; dated Sep. 25, 2014.

*Primary Examiner* — Gerald Gauthier
(74) *Attorney, Agent, or Firm* — Brooks Kushman P.C.

(57) ABSTRACT

A communication system particularly for managing voice, video and data services between the station of an operator and the station of a user, the system including at least one device controlled by the operator to receive telephone calls forwarded by a call routing center and at least one unit that is controlled by the user and provided with elements for entering and displaying information and generating telephone calls. The device further includes elements for disabling the audio component of a telephone call generated by the at least one unit and elements for establishing with the unit a video call associated with the telephone call.

20 Claims, 2 Drawing Sheets

(56) References Cited

U.S. PATENT DOCUMENTS

| | | | | |
|---|---|---|---|---|
| 6,597,685 | B2* | 7/2003 | Miloslavsky | G06Q 10/107 |
| | | | | 348/E7.082 |
| 6,879,582 | B1* | 4/2005 | Dhara | H04M 7/0069 |
| | | | | 370/329 |
| 7,305,082 | B2* | 12/2007 | Elazar | H04M 3/5191 |
| | | | | 379/265.07 |
| 8,488,591 | B2* | 7/2013 | Miali | H04L 29/06027 |
| | | | | 348/14.01 |
| 8,723,911 | B1* | 5/2014 | Shochet | H04N 7/147 |
| | | | | 348/14.01 |
| 8,731,180 | B2* | 5/2014 | Benefield | H04L 12/1827 |
| | | | | 348/14.01 |
| 2006/0074760 | A1* | 4/2006 | Helin | G06F 17/30864 |
| | | | | 705/14.1 |
| 2006/0152577 | A1* | 7/2006 | Hagendorf | H04N 7/14 |
| | | | | 348/14.01 |
| 2006/0221176 | A1 | 10/2006 | Di Pietro et al. | |
| 2007/0041551 | A1* | 2/2007 | Whitecotten | H04M 3/5233 |
| | | | | 379/212.01 |
| 2008/0084885 | A1 | 4/2008 | Salkintzis | |
| 2008/0279177 | A1* | 11/2008 | Shlomot | H04M 7/0069 |
| | | | | 370/352 |
| 2010/0329441 | A1* | 12/2010 | Smith | H04M 3/382 |
| | | | | 379/207.11 |
| 2015/0208030 | A1* | 7/2015 | Durante | H04N 7/141 |
| | | | | 348/14.01 |

\* cited by examiner

SYSTEM FOR INTEGRATING VIDEO CALLS IN TELEPHONE CALL CENTERS

CROSS-REFERENCE TO RELATED APPLICATIONS

This application claims the benefit of Italian Patent Application No. MI2014A000080 filed Jan. 22, 2014, the disclosure of which is hereby incorporated in its entirety by reference herein.

TECHNICAL FIELD

The present application lies in the field of telecommunications and in particular relates to a system and a method for remote management of voice, video and data services between the station of a user and the station of an operator.

SUMMARY

The need to manage increasing telephone traffic flows in an efficient manner has prompted companies of a certain size or of a certain importance to use dedicated offices, commonly called call centers, that have the specific task of answering quickly and precisely the requests of customers. An efficient management of call centers, which are composed typically of devices, computer systems and qualified staff, requires a use of considerable resources, maintenance and updates of the systems and ongoing training of employees.

For this reason, many companies that do not have the resources or do not intend to bear these management costs for reasons of convenience, instead of providing an in-house call center outsource the service, i.e., ask third-party companies specialized in the field to manage on their behalf the telephone calls of customers. By doing so, the customer who needs assistance gets in touch, in a transparent manner, with an operator who is not actually part of the staff of the company that the customer intends to contact but is capable of meeting his requests directly or by forwarding the telephone call in turn to a qualified person.

Outsourced call centers can therefore offer their services to a plurality of companies that are not related to each other at all and, by using the same infrastructure and the same staff, allow the distribution, and therefore reduction, of costs and elimination of the inefficiencies and redundancies of in-house call centers.

In some cases, however, it is necessary to provide the customer with the possibility of a more real contact, provided for example with a video call, with a person who represents the company, a contact that is closer, in terms of perception and satisfaction to the customer, to a meeting in person.

A situation of this type is described for example in WO2013098790, which describes a video-reception system for accessing a protected area and for providing a sales service in which a visitor contacts a remote operator through a video call by means of multimedia platforms.

Video calls have, in summary, similar problems, which in the field of telephone calls have been dealt with and to a large extent have been solved by the onset of call centers. For example, it is necessary to manage situations in which the person required might not be available, the request itself might be addressed to the wrong person or to the person least qualified to answer or the employee might be busy managing another request.

Therefore, the need is felt to have call centers capable of integrating video calls, i.e., capable of managing them by offering for them the same type of service that is ensured for traditional calls. Integration, however, is not simple, because it requires important reconfigurations and substantial modifications to existing call centers, since these are not capable of interfacing conveniently with existing video call systems. For example, it is known that video call systems use signaling protocols of the IP type such as SIP, acronym of Session Initiation Protocol, while some existing call centers use traditional telephone technologies that do not provide for this type of signaling, or use different protocols such as the H.323 protocol. Other problems can originate from the fact that video call systems are configured to interface with servers that require identification of the recipient of the video call and not, as in the case of call centers, with the servers that have the task of sorting calls and act as a proxies. In addition, there is the fact that typically the servers of telephone call centers are not capable of managing natively RTP video streams and in general audio-video streams relating to video calls.

Another problem might arise from the fact that the devices of the operators of call centers are not provided with applications capable of managing video calls.

From what has been described above, it is clear that adapting existing call centers based on changing technologies and infrastructures is expensive and not easy to provide. Moreover, it is not sufficient to adapt call centers so that they can manage video calls; one should also ensure for them all the additional services that modern call centers offer for traditional calls, such as for example realtime monitoring of calls and operator activities, generating reports, i.e., information related to the calls, such as their duration, and to the activities of the operators, tools for helping on the one hand the operator in carrying out his work and on the other hand the service administrator in managing the operators.

In fact, while management of traditional telephone calls can now rely on years of consolidated experience and infrastructure, management of video calls would require substantial new investments to import the services already managed by call centers, as well as the use of additional resources, to provide a video call center with the same characteristics.

Since these are costs that are substantial and sometimes even not justifiable for companies in which video calls are a marginal component with respect to voice calls, accordingly the quality of the service offered might not be adequate for the requirements of customers.

The aim of the present application is therefore to overcome the limitations of the background art highlighted above, proposing a system that allows transparent integration of the management of video calls in systems of call centers of the telephone type and does not entail substantial modifications to existing infrastructures.

Within this aim, an object of the present application is to ensure a management of the video call service that is equivalent to the management of telephone calls that does not entail an increase in costs or the hiring of new staff.

A further object of the application is to provide the system with means that make it easy to use and relatively simple to configure, allowing its deployment and use on a plurality of stations.

Another object of the application is to provide a method that allows an operator of a call center to distinguish effectively voice calls from video calls.

This aim and these and other objects that will become more apparent hereinafter are achieved by a system according to claim 1.

This aim and these and other objects are also achieved by a method according to claim 10.

Advantageously, the system allows the use of readily available devices.

Conveniently, the system according to the present application is modular and easy to configure.

Preferably, the system according to the present application allows the concurrent management of multiple requests coming from a plurality of customers.

Further characteristics and advantages of the application will become more apparent from the following detailed description, given by way of non-limiting example and accompanied by the associated figures, wherein:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
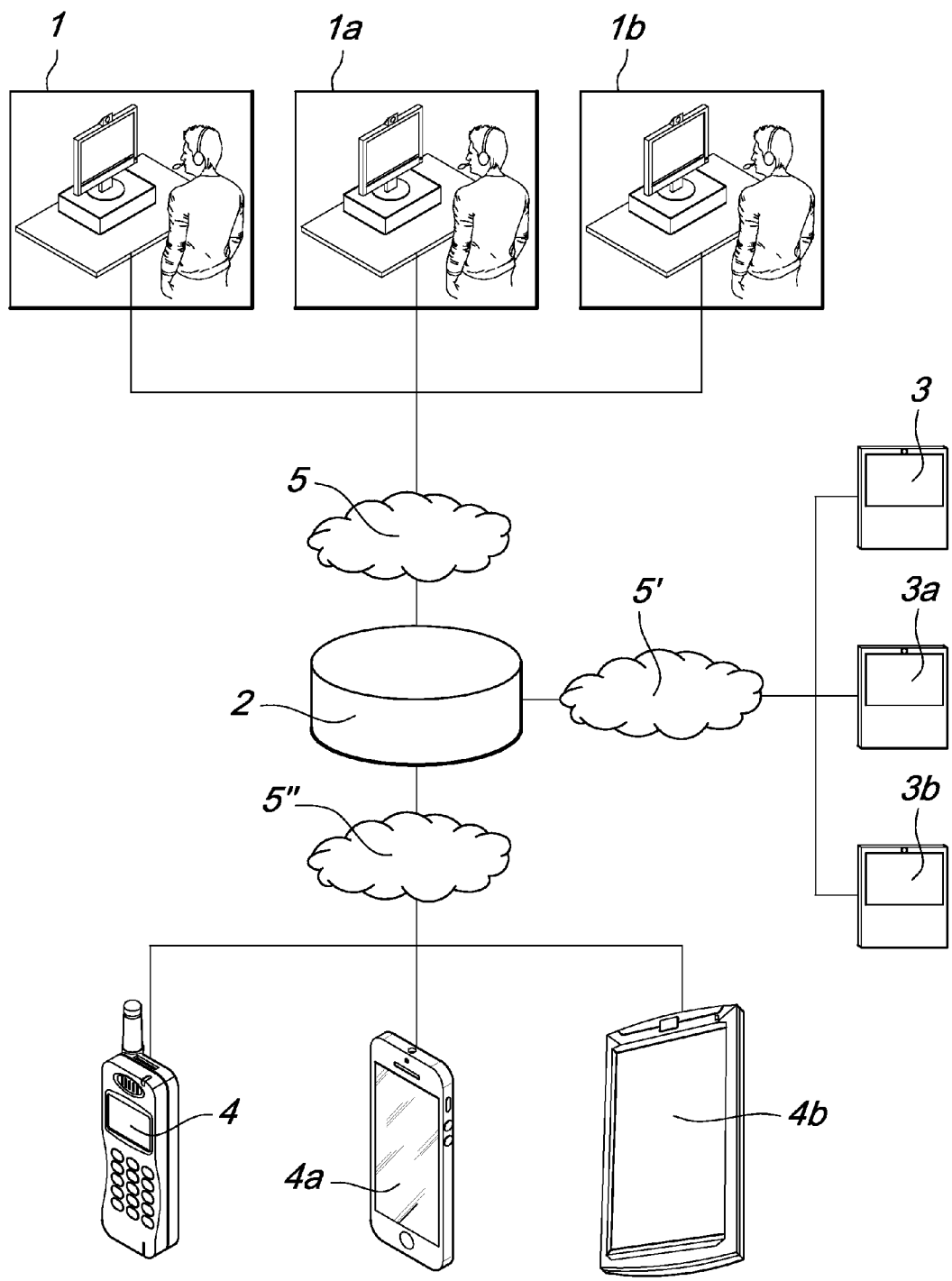
FIG. 1 is a block diagram of an architecture of the system according to the present application.

An exemplifying architecture of the system according to the present application is summarized in the block diagram of FIG. 1.

FIG. 1 shows a plurality of operator stations provided with devices 1, 1a, 1b connected to a call routing center 2, a plurality of multimedia units 3, 3a, 3b, and a plurality of voice terminals 4, 4a, 4b. These elements are interconnected, in a manner that is clarified hereinafter, by means of the networks 5, 5', 5", which comprise, by way of example, dedicated lines, the telephone network, the Internet, public and private IP networks, Wi-Fi connectivity.

The operator stations and the center 2 are preferably managed by an administrator and can be located at the same site or at remote sites. In any case, the stations and the center 2 are interconnected by means of the network 5, which is preferably a private network, "intranet". Unless it is otherwise specified or can be inferred from the context, hereinafter the term "call" designates a request for contact via a telecommunications network, the expression "telephone call" or "voice call" designates a call in real time over a telecommunications network which, after the answer, entails the exchange of audio streams and involves a caller, typically the user who controls the unit 3, 3a, 3b or the terminal 4, 4a, 4b and a called party, typically the operator; and the expression "video call" is understood to designate a call in real time over a telecommunications network which, after the answer, entails the exchange of audio and video streams. The telecommunications network comprises both traditional telephone networks (such as PSTN networks, PLMN networks based on technologies of the TDM, Time Division Multiplexing, and IP type), in which the calls are administered, and therefore detected and billed, by telephone operators, and telecommunications networks that are not managed directly or in which the calls are not managed directly by telephone operators. The term "company" means any organization that requests the administrator of the voice and data management service according to the present application to manage the requests for contact of its own customers.

Each one of the stations is managed by an operator and is provided with a device 1, 1a, 1b for managing the calls. In the typical case, the administrator has in a work area a plurality of operator stations organized in the most suitable manner to allow each operator to answer the calls effectively. The device 1, 1a, 1b comprises an electronic computer, preferably a general purpose computer provided with input/output means, such as keyboard, screen and headphones, and is provided furthermore with means for running programs. Preferably, these programs comprise a softphone, which allows receiving and making telephone calls over IP by using the most common communication protocols and audio codecs. The person skilled in the art understands without inventive effort that if the operator station is provided with a "hardphone", the operator, upon receiving the video call, connects manually or with the aid of a device the headphones to the computer of his station, whereas if a softphone is used the headphones, which are connected to the computer, are configured to pass automatically to the reception of the audio of the video call.

The device 1, 1a, 1b has, moreover, a graphical interface for entering and displaying information. The device 1, 1a, 1b has, moreover, means for accessing local or remote storage systems, managed by the administrator of the service, which contain relevant information linked to the companies and means for rapidly obtaining this information automatically or manually with queries based for example on the number of the caller or on the entry of appropriate data by the operator.

The station devices 1, 1a, 1b and likewise the units 3, 3a, 3b have access to the Internet or to public or private IP networks. This access can take place by means of network components, not shown in FIG. 1, which are not controlled by the routing center 2.

The routing center 2 is the component that acts as the interface between customers and station operators. The center 2 comprises means for routing telephone calls generated by users, typically customers of companies that use the units 3, 3a, 3b or the terminals 4, 4a, 4b, to a specific operator station according to specific criteria. For example, if a specific group of operators is qualified to answer questions concerning a specific technical field, the center 2 forwards the call to one of these operators. Moreover, the center 2 can select an operator by browsing a list that indicates the availability of an operator to answer a call, "Ready" state, or the unavailability because for example he is busy in processing the result of a previous video call, "After Call work" state. Again, the routing criterion can comprise the analysis of the telephone number of the caller or of the called party.

The routing center 2 can comprise various information technology apparatuses used in the field of telephone call management that are located preferably at the same site, are interconnected, are commercially available and are capable of supporting common technologies used in the telecommunications field. The center 2 comprises a PBX system, acronym of Private Branch Exchange. Preferably, this PBX is of the IP type and comprises hardware and software components that allow connecting the devices 1, 1a, 1b to the public switched telephone network, PSTN, for telephone communication with the terminals 4, 4*a*, 4*b* and, indirectly, with the units 3, 3*a*, 3*b*. If the PBX is of the IP type, it is connected to a gateway of the VoIP type and supports preferably the SIP protocol, acronym of Session Initiation Protocol.

The center 2 comprises moreover means for managing telephone calls. These means are provided preferably by software modules that allow assignment of the received telephone calls to one of the station operators, the management of the operators, the collection of information connected to the call, such as the duration and the generation of a call report, i.e., of a document organized according to criteria that ensure its easy consultation.

The multimedia unit 3, 3*a*, 3*b* is a hardware device provided with an input/output interface, such as a touch screen, and a user-friendly graphic interface, which makes it possible to enter and display information, optionally a physical or touch keyboard. In particular, the unit 3, 3*a*, 3*b* allows a user, such as the customer of a company, to request to be connected to an operator by selecting for example an icon shown on the screen of the unit 3, 3*a*, 3*b*. This request causes the automatic generation, i.e., without the necessity for the user to dial any number, of a voice call by the unit 3, 3*a*, 3*b* directed at the routing center 2 and the establishment, according to methods clarified hereinafter, of a communication channel that comprises a video call, between the device of the operator of the station 1, 1*a*, 1*b* and the user who uses the unit 3, 3*a*, 3*b*.

In order to establish this channel, the unit 3, 3*a*, 3*b* and the station devices 1, 1*a*, 1*b* comprise one or more applications that communicate directly, peer to peer, or by means of a server. The setup of the communication channel is initiated by the application (prompted automatically or manually) that is on the operator device and identifies the unit 3, 3*a*, 3*b* starting from information of the voice call received by the routing center. For example, the name of the service associated with the voice call can be unique for each caller.

The mechanisms and protocols related to the communication channel can be proprietary or standard.

One example of such a protocol is the XMPP protocol (Xtensible Messaging and Presence Protocol).

By means of the communication channel, the device of the operator communicates to the unit 3, 3*a*, 3*b* to generate automatically (i.e., without the need for any intervention by the user) a video call to the same device of the operator who will answer the video call automatically or manually. The video call can be established directly (peer to peer) or by means of a server and can use proprietary or standard mechanisms, codecs and protocols.

An example of an application for the video call is the Jabber client by Cisco, which allows connection to a video communication server, not shown in FIG. 1 (for example a Cisco system with Vcs server, acronym of Video Communication Server), managed by the administrator.

The communication channel, including the video call, is transparent to the center 2, i.e., it is established without the center 2 having the possibility to be aware of it. In this manner, the user who uses the unit 3, 3*a*, 3*b* has the possibility of communicating in real time, having moreover a visual encounter with the operator, thus making the communication more effective.

The terminal 4, 4*a*, 4*b* for telephone calls is of the known type and comprises landline telephones, mobile phones but also processing units such as tablets provided with means for accessing the telephone network. The owner of the terminal 4, 4*a*, 4*b* contacts the company from which he requests assistance by dialing a telephone number recognized by the routing center 2.

Figure 2:
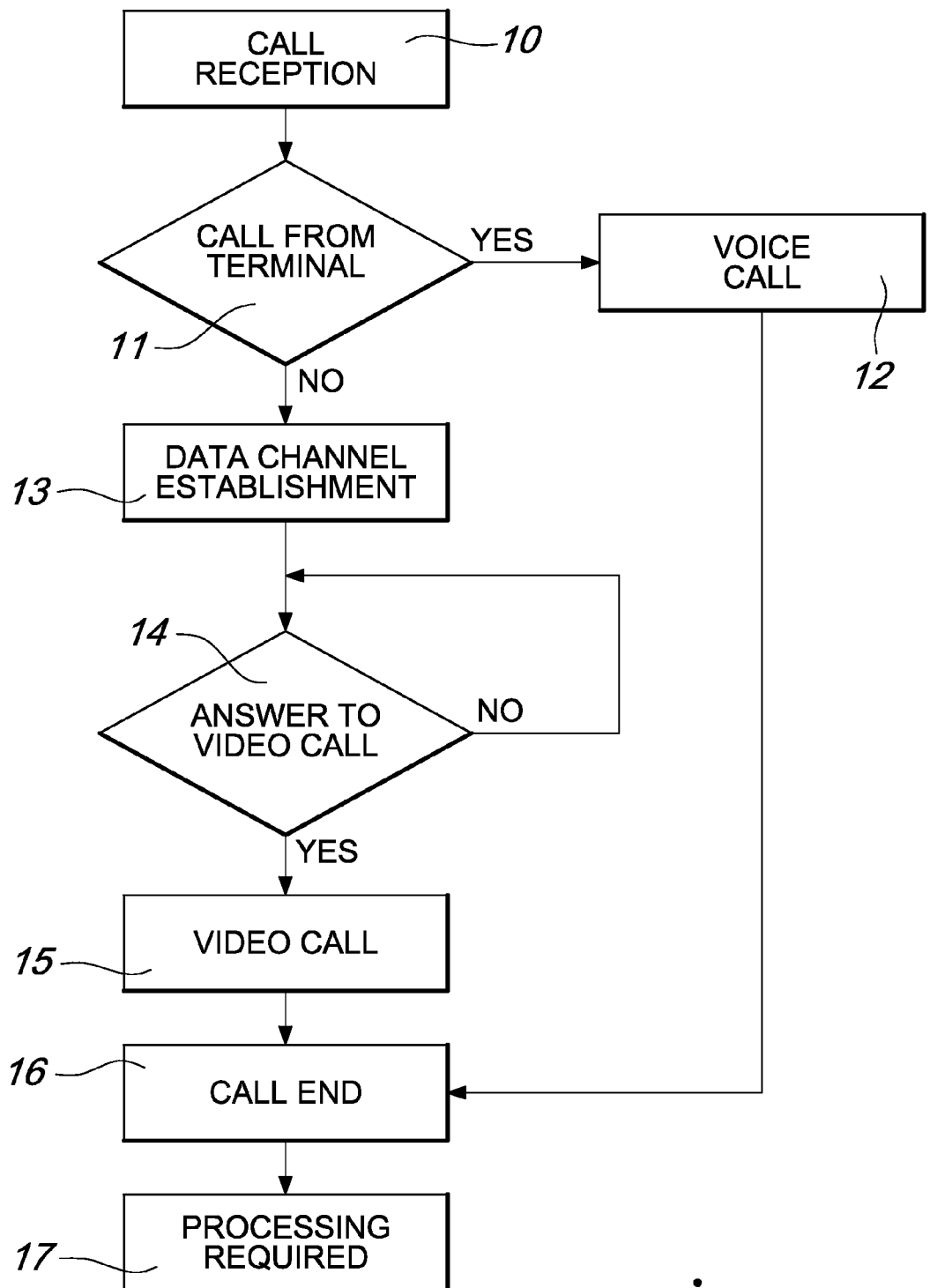
FIG. 2 is a flowchart that explains in greater detail the operation of the system of FIG. 1.

With reference to the flowchart of FIG. 2, the operation of the system of FIG. 1 will be now illustrated.

In step 10, the routing center 2 receives a telephone call generated by a user who uses a terminal 4, 4*a*, 4*b* or a unit 3, 3*a*, 3*b* and distributes this intercepted call to a station operator. Once the call routing operation has been completed, the management means monitor the telephone call, collecting information connected to the call, such as for example the number of the caller, the number of the called party and the duration of the call. Preferably, these data are used by the administrator of the center 2 to bill the company to which he offers the service for the costs linked to the call and to the management of the calling customer.

In step 11, the operator determines whether the telephone call originates from a terminal 4, 4*a*, 4*b* or from a unit 3, 3*a*, 3*b*.

If the call originates from a terminal 4, 4*a*, 4*b*, the telephone call is managed by the operator, who answers verbally the requests of the customer in the most suitable manner, step 12, according to the methods of traditional call centers.

In step 13, the station device 1, 1*a*, 1*b* accepts a telephone call that originates from a unit 3, 3*a*, 3*b* and establishes with it a communication channel, preferably a data session. Preferably, this session is established by means of a connection using an application of the device that is prompted in a manner which is typically automatic, but also manual, configured to contact a functionally equivalent application installed on the unit 3, 3*a*, 3*b*. Preferably, the user of the unit 3, 3*a*, 3*b* does not dial any telephone number and generates this telephone call by interaction with the unit 3, 3*a*, 3*b*, for example by selecting an icon shown on the screen of this unit, which typically asks whether the user wishes to generate a video call (or even just a voice call). Once the data session has been established, the unit 3, 3*a*, 3*b* can send, automatically because the user of the unit 3, 3*a*, 3*b* had already selected an icon for a video call, or for example after a new selection of an icon because the customer wishes at that moment a visual interaction with the operator and selects at that moment a corresponding icon, a video call that the operator can answer, step 14.

In step 15, the video call is in the connected state: the operator and the customer see each other and talk to each other. The station device 1, 1*a*, 1*b* optionally disables the audio component of the telephone call originating from the unit 3, 3*a*, 3*b* in the 2 directions or clears or strongly reduces its volumes. This operation is important if the audio played back in relation to the original telephone call is not synchronized with the audio of the video call. For this reason, the device 1, 1*a*, 1*b* is provided with means for disabling the audio component of the telephone call when the audio signal of the telephone call is not synchronized with the audio signal of the video call. In other cases this operation is not necessary. If the operator uses a hardphone for telephone calls, he will move the headphones from the hardphone to the PC before answering the video call, or he will change the headphones, muting the telephone call automatically.

The station device 1, 1*a*, 1*b* creates a unique association between the telephone call and the video call. The association is such that the interruption of the video call entails the interruption of the telephone call. Even if the video call occurs in a manner which is completely transparent to the center 2, the management mechanisms of the center 2 continue to monitor the telephone call, which remains active, although optionally muted, tracking for example its duration. Since the video call and the telephone call are associated uniquely, monitoring the duration of the telephone call makes it possible to collect information, such as the duration, regarding the associated video call. In this manner, the actual communication between the operator and the user of the unit 3, 3a, 3b occurs by means of a video call. Moreover, in a first step the telephone call is used to put the customer who uses the unit 3, 3a, 3b in touch with the station operator selected by the routing center 2 and in a second step, i.e., from when the operator activates the video call to when the operator interrupts the video call, it is used for operational purposes, i.e., for collecting information from the management means of the center 2. In this manner it is possible, for the monitoring means of the center 2, to keep on tracking the time used by the operator for the conversation with the user and to generate a suitable report, to see in real time the operator as being busy in a call and therefore not distribute other calls to him, to calculate correctly in real time the workload of the operator (a parameter that can be used in call distribution).

In step 16, the operator or the user decides to interrupt the conversation. Interruption of the conversation entails closing the telephone call and simultaneously closing the corresponding video call, if any, i.e., if the caller is a customer who uses the unit 3, 3a, 3b. Preferably, the station device 1, 1a, 1b has a software module that interrupts the telephone call automatically when the video call is interrupted. Independently of whether a video call has occurred or not, the duration of the conversation corresponds to the duration of the telephone call, which comprises also the step in which the voice component is optionally deactivated.

Step 17 is optional and allows an operator who has answered a video call to place himself, at the end of the video call, into a state of unavailability for call reception. This state, in some call centers, can be also configured in the center 2 as the subsequent automatic state of the operator who has managed a call for that specific service. Therefore, the device 1, 1a, 1b notifies the center 2 about its own unavailability to receive new calls so as to be able to process (for example by writing a report on the call) the requests of the customer that have emerged during the video call. After processing the requests, the station device 1, 1a, 1b signals to the center the availability to receive new calls.

The system and method proposed can find application also in video communication systems that are not capable of managing the audio component. In this case it is sufficient to keep active, i.e., with the audio component not muted, the original telephone call and place it alongside the video communication. A video system that does not support the audio component can be provided by means of a video streaming between the devices 1, 1a, 1b and the units 3, 3a, 3b.

The video communication would be activated at the same time described for the activation of the video call and with methods similar to those described for the video call which make it undetected and transparent with respect to the call center system. Obviously, use of the audio component of the telephone call alongside the video communication is possible if the video signal of the video communication system has a limited delay and therefore is synchronized sufficiently with the audio signal of the telephone call.

It has thus been shown that the method and system described achieve the intended aim and objects. In particular, it has been shown that the system thus conceived makes it possible to overcome the quality limitations of the background art, allowing the use of traditional call center systems for the management of video calls.

In this manner, the structure of the routing center 2 is not subjected to any modification; therefore, the management means, which usually comprise proprietary software, of the center can be reused. The modifications remain substantially confined to the device of the operator and are inexpensive because they can be provided by installing a software application in the device. In this manner, the management of video calls inherits automatically, thanks to the processing by the management means, the functional characteristics and the performance of voice call centers without the need to install additional dedicated hardware.

The described system makes it possible to integrate in call centers the management of video calls that cannot be directly managed by a call center by introducing modifications that do not relate to the call center per se but are limited to an adaptation of the device of the operator, and on the unit available to the calling user.

Clearly, numerous modifications are evident and can be performed promptly by the person skilled in the art without abandoning the protective scope of the present application.

Therefore, the protective scope of the claims must not be limited by the illustrations or by the preferred embodiments illustrated in the description as examples, but rather the claims must comprise all the patentable novelty characteristics that reside within the present application, including all the characteristics that would be treated as equivalent by the person skilled in the art.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A communication system particularly for managing voice, video and data services between an operator station and a user unit, the system comprising:
    at least one operator station controlled by the operator to receive telephone calls forwarded by a call routing center, wherein a telephone call comprises an audio component; and
    at least one user unit that is controlled by the user and is provided with means for entering and displaying information and generating telephone calls and video calls, wherein a video call comprises an audio signal and a video signal;
    wherein the at least one operator station is programmed to:
        means for disabling the audio component of the telephone call generated by the at least one unit; and
        means for establishing with the at least one unit the video call provided with the audio signal and the video signal,
    wherein the video call is associated uniquely with the telephone call such that the interrupting of the video call automatically and simultaneously interrupts the telephone call.

2. The system according to claim 1, wherein the routing center comprises means for monitoring and distributing telephone calls generated by the at least one unit or by one or more call terminals.

3. The system according to claim 1, wherein the routing center continues to monitor the disabled telephone call to collect call information.

4. The system according to claim 3, wherein the routing center is further configured so as to generate information on the video call on the basis of the call information collected on the telephone call, the audio component of which has been disabled.

5. The system according to claim 1, wherein the at least one operator station comprises means for establishing whether the telephone call has been generated by the at least one unit is capable of establishing the video call including the audio data and video data.

6. The system according to claim 1, wherein the at least one operator station and the at least one user unit each comprise a software application capable of establishing a data session different than the video call.

7. The system according to claim 1, wherein the operator station is a computer provided with means for executing software instructions.

8. The system according to claim 3, wherein the call information comprises the duration of the call.

9. The system according to claim 1, wherein the at least one operator station further comprises means for disabling the reception of telephone calls by the center.

10. The system according to claim 1, wherein the means for disabling the audio component of the telephone call disable the audio component when the audio component of the telephone call is not synchronized with the audio signal of the video call.

11. A communication method particularly for managing voice, video and data services between an operator station and a user unit, the method comprising the steps of:
monitoring incoming telephone calls by a routing center;
providing at least one operator station that is configured to receive telephone calls forwarded by the center, wherein the telephone calls comprise audio components;
receiving, by a routing center, a telephone call originating from at least one user unit;
distributing the telephone call by the routing center to an operator station;
disabling, by the operator station, the audio component of the telephone call generated by the at least one user unit and simultaneously establishing a video call with the at least one user unit, wherein the video call is provided with an audio signal and a video signal, wherein communication between the operator and user occurs only by the video call;
associating uniquely the video call with the telephone call so that the closing of the video call automatically and simultaneously closes the telephone call.

12. The communication method according to claim 11 further comprising continuing to monitor the telephone call, by the routing center, after the telephone call disabled by the user device, to collect call information.

13. A communication system for managing voice, video and data services between an operator station and a user unit, the system comprising:
at least one operator station programmed to:
receive commands from an operator and receive a telephone call comprising an audio component forwarded by a call routing center;
establish, a video call provided with an audio signal and a video signal, wherein communication between the operator and user occurs only by the video call;
establish with the at least one user unit a unique association between the video call and the telephone call and disable the audio component of the telephone call;
establish a data session different from the video call with a software application provided on each of the at least one operator station and user unit.

14. The system according to claim 13, wherein the at least one operator station is further programmed to simultaneously interrupt the telephone call and the uniquely associated video call.

15. The system according to claim 13, wherein the call routing center continues to monitor the disabled telephone call to collect call information.

16. The system according to claim 15, wherein the call routing center generates information associated with the video call based on collected call information associated with the telephone call, the audio component of which has been disabled.

17. The system according to claim 13, wherein the at least one operator station is a computer programmed to execute software instructions.

18. The system according to claim 15, wherein the call information comprises a duration of the telephone call.

19. The system according to claim 13, wherein the at least one operator station is further programmed to disable reception of telephone calls by the center.

20. The system according to claim 13, wherein the at least one operator station is further programmed to, in response to the audio component of the telephone call not being synchronized with the audio signal of the video call, disable the audio component of the telephone call.

* * * * *